United States Patent
Kopeinigg et al.

(10) Patent No.: US 11,145,133 B2
(45) Date of Patent: Oct. 12, 2021

(54) METHODS AND SYSTEMS FOR GENERATING AN ANIMATED 3D MODEL BASED ON A 2D IMAGE

(71) Applicant: Verizon Patent and Licensing Inc., Arlington, VA (US)

(72) Inventors: Daniel Kopeinigg, Palo Alto, CA (US); Solmaz Hajmohammadi, Palo Alto, CA (US); Sourabh Khire, Palo Alto, CA (US); Trevor Howarth, San Francisco, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/831,209

(22) Filed: Mar. 26, 2020

(65) Prior Publication Data

US 2020/0312037 A1     Oct. 1, 2020

Related U.S. Application Data

(60) Provisional application No. 62/824,459, filed on Mar. 27, 2019.

(51) Int. Cl.
   *G06T 13/40* (2011.01)
   *G06T 19/00* (2011.01)
   (Continued)

(52) U.S. Cl.
   CPC ........ *G06T 19/006* (2013.01); *G06K 9/00208* (2013.01); *G06N 20/00* (2019.01);
   (Continued)

(58) Field of Classification Search
   None
   See application file for complete search history.

(56) References Cited

U.S. PATENT DOCUMENTS

| | | | |
|---|---|---|---|
| 6,487,312 B2 | 11/2002 | Kostrzewski et al. | |
| 7,342,580 B1 | 3/2008 | Peterson | |
| 10,529,137 B1 | 1/2020 | Black et al. | |
| 2010/0111370 A1 | 5/2010 | Black et al. | |
| 2015/0379369 A1* | 12/2015 | Liang .................. | G06K 9/4652 348/77 |

(Continued)

OTHER PUBLICATIONS

Fechteleretal., "Animatable 3D model Generation from 2D Monocular Visual Data", 2018, IEEE. (Year: 2018).*

(Continued)

*Primary Examiner* — Nicholas R Wilson

(57) ABSTRACT

An illustrative volumetric capture system accesses a two-dimensional ("2D") image captured by a capture device and depicting a first subject of a particular subject type. The volumetric capture system generates a custom three-dimensional ("3D") model of the first subject by identifying a parameter representative of a characteristic of the first subject, applying the parameter to a parametric 3D model to generate a custom mesh, and applying a custom texture based on the 2D image to the custom mesh. The volumetric capture system also accesses a motion capture video depicting motion performed by a second subject of the particular subject type. Based on the motion capture video, the volumetric capture system animates the custom 3D model of the first subject to cause the custom 3D model to perform the motion performed by the second subject. Corresponding methods and systems are also disclosed.

20 Claims, 10 Drawing Sheets

(51) Int. Cl.
*G06T 17/20* (2006.01)
*G06K 9/00* (2006.01)
*G06T 7/70* (2017.01)
*G06N 20/00* (2019.01)
*G06T 15/04* (2011.01)
*G06T 15/08* (2011.01)

(52) U.S. Cl.
CPC ............. *G06T 7/70* (2017.01); *G06T 13/40* (2013.01); *G06T 15/04* (2013.01); *G06T 15/08* (2013.01); *G06T 17/205* (2013.01); *G06K 9/00342* (2013.01); *G06T 2200/08* (2013.01); *G06T 2207/30196* (2013.01); *G06T 2207/30244* (2013.01); *G06T 2215/16* (2013.01)

(56) References Cited

U.S. PATENT DOCUMENTS

| 2019/0026942 | A1 | 1/2019 | Zhang |
| 2019/0213773 | A1 | 7/2019 | Lee et al. |
| 2019/0253638 | A1 | 8/2019 | Wen et al. |
| 2019/0371080 | A1 | 12/2019 | Sminchisescu et al. |

OTHER PUBLICATIONS

Mikolas Zuza, "Photogrammetry—3D scanning with just your phone/camera" https://blog.prusaprinters.org/photogrammetry-3d-scanning-just-phone-camera_7811/, 2018. (Year: 2018).*

Mukai et al., "Efficient Dynamic Skinning with Low-Rank Helper Bone Controllers", ACM 2016. (Year: 2016).*

* cited by examiner

METHODS AND SYSTEMS FOR GENERATING AN ANIMATED 3D MODEL BASED ON A 2D IMAGE

RELATED APPLICATIONS

The present application claims priority under 35 U.S.C. § 119(e) to U.S. Provisional Patent Application No. 62/824,459, filed on Mar. 27, 2019, and entitled "Machine Learning System for Cross Reality" (the "provisional application"). The contents of the provisional application are hereby incorporated by reference in their entirety.

BACKGROUND INFORMATION

In a variety of entertainment, educational, vocational, promotional, and/or other applications and use cases, it may be desirable to model various real-world objects within a real-world scene. For example, by modeling objects such as people, furnishings, walls, floors, and ceilings in a real-world room, a system may provide a virtual reality experience associated with the real-world room and the objects included therein to a user who is located somewhere other than the real-world room. As another example, by creating a model of a subject (e.g., a person, an animal, an inanimate object, etc.) that is present in a real-world environment, a system may provide an augmented reality experience involving the subject to the user. For instance, the model may be inserted as an augmentation into a real-world environment to make it appear as if the subject is present where the subject is not actually present, or the model may be represented within a virtual reality world being experienced by the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Methods and systems for generating an animated three-dimensional ("3D") model based on a two-dimensional ("2D") image are described herein. Conventional methods of generating 3D volumetric models may rely on data captured from a plurality of capture devices disposed in a fixed formation surrounding the subject that is to be modeled. In contrast, methods and systems described herein may be used to dramatically reduce the amount of image data and/or the number of capture devices that are employed to generate a 3D volumetric model of a real-world subject. For example, as will be described in more detail below, methods and systems described herein may generate a full, volumetric model of a subject using as little image data as a single image captured by a single capture device (e.g., a built-in camera included within a mobile device such as a smartphone or tablet device, etc.) without relying on any other image data depicting the subject.

More particularly, methods and systems described herein may use color data (e.g., red-blue-green or RGB data) captured from a single capture device to fit a generic, parametric 3D model associated with a particular subject type (e.g., a human subject type, etc.) to a specific subject of that subject type (e.g., a particular person) to thereby form a custom 3D model of that specific subject (e.g., a custom 3D model of the particular person). The custom 3D model may then be animated to perform any desirable behavior, including a behavior that the subject may not have performed or may not be able or inclined to perform (e.g., professional dance moves or action stunt moves in the case where the subject is a person). Such behaviors may themselves be captured using a single capture device when the behaviors are performed by the same or a different subject of the same subject type (e.g., a professional dancer, an actor, etc.). As a result, various useful animation, entertainment, educational, vocational, communication, and/or other applications may be implemented and deployed using methods and systems described herein.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems described herein may provide one or more of the benefits mentioned above, as well as various additional and/or alternative benefits that will be explicitly described or made apparent below.

Figure 1:
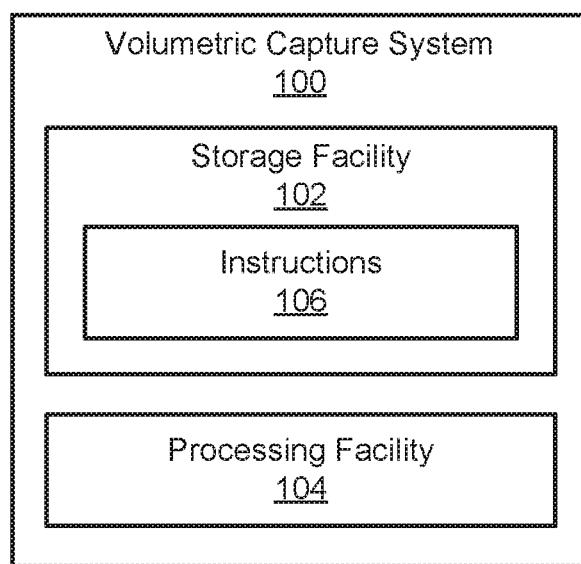
FIG. 1 shows an illustrative volumetric capture system for generating an animated three-dimensional ("3D") model based on a two-dimensional ("2D") image according to embodiments described herein.

FIG. 1 shows an illustrative volumetric capture system 100 ("system 100") for generating an animated 3D model based on a 2D image according to principles described herein. System 100 may be implemented by computer resources of a mobile device (e.g., a smartphone, a tablet, etc.), a local computer system or server disposed at a location near an end user, a distributed computer system or server disposed at a location apart from the end user (e.g., a multi-access edge compute ("MEC") server, a cloud server, etc.), a combination of these devices and/or systems, or any other suitable computing system or device (e.g., servers, processors, memory devices, storage devices, etc.) as may serve a particular implementation.

As shown, system 100 may include, without limitation, a storage facility 102 and a processing facility 104 selectively and communicatively coupled to one another. Facilities 102 and 104 may each include or be implemented by hardware and/or software components of a suitable computing system (e.g., processors, memories, communication interfaces, instructions stored in memory for execution by the processors, etc.). In some examples, facilities 102 and 104 may be distributed between multiple devices and/or multiple locations as may serve a particular implementation. Each of facilities 102 and 104 within system 100 will now be described in more detail.

Storage facility 102 may store and/or otherwise maintain executable data used by processing facility 104 to perform any of the functionality described herein. For example, storage facility 102 may store instructions 106 that may be executed by processing facility 104. Instructions 106 may be executed by processing facility 104 to perform any of the functionality described herein. Instructions 106 may be implemented by any suitable application, software, code, and/or other executable data instance. Additionally, storage facility 102 may also maintain any other data accessed, managed, used, and/or transmitted by processing facility 104 in a particular implementation.

Processing facility 104 may be configured to perform (e.g., execute instructions 106 stored in storage facility 102 to perform) various functions associated with generating an animated 3D model based on a 2D image in any of the ways described herein. In one illustrative embodiment, for instance, processing facility 104 may be configured to access a 2D image captured by a capture device and depicting a first subject of a particular subject type. For instance, in certain implementations in which system 100 is implemented by a mobile device including a built-in camera configured to capture 2D images, the capture device may also be implemented as the mobile device (or, more particularly, by the built-in camera of the mobile device). In such implementations, the 2D image captured by the capture device may be represented by image data that includes color data captured by the camera. In some examples, the color data may be RGB data that does not include depth data. In other implementations, other types of capture devices (e.g., standalone cameras, video cameras, depth capture devices, etc.) may implement the capture device capturing the 2D image and the 2D image may be represented by image data that includes RGB data or RGBD data (i.e., RGB data that is also combined with depth data).

Upon accessing the 2D image (or upon accessing a plurality of 2D images, as in certain examples that will be described in more detail below), processing facility 104 may generate a custom 3D model of the first subject. For example, if the particular subject type is a human subject type and the first subject is a particular person, processing facility 104 may generate a custom 3D model of the particular person. The custom 3D model may include a custom texture that is based on the 2D image and that is applied to a custom mesh generated based on a parametric 3D model associated with the particular subject type (e.g., a generic 3D model that can take different forms based on input parameters). Accordingly, to generate the custom 3D model, processing facility 104 may perform operations including: 1) identifying, based on the 2D image depicting the first subject, a parameter representative of a characteristic of the first subject; 2) applying the parameter to the parametric 3D model to generate a custom mesh for the custom 3D model; and 3) applying the custom texture to the custom mesh.

Processing facility 104 may also access a motion capture video depicting motion performed by a second subject of the particular subject type. For example, if the particular subject type is the human being type, the second subject may be another person (e.g., a different person besides the particular person depicted in the 2D image) or may be the same particular person (e.g., if the motion capture video was captured previously, etc.). In the motion capture video, the second subject may behave in a particular way. For example, in examples where the first and second subjects are human beings, the second subject may be a skilled dancer, actor, or stunt person; a friend or acquaintance of the first person; a synthetic (e.g., a computer-generated person); or any other human being performing any motion as may serve a particular implementation. In other examples, the first and second subjects may be of a particular subject type that is not a human subject type, such as an animal subject type or a subject type associated with a particular type of inanimate object or the like.

Regardless of the subject type of the first and second subjects and the motion performed in the motion capture video, processing facility 104 may animate, based on the motion capture video, the custom 3D model of the first subject to cause the custom 3D model to perform the motion performed by the second subject. For example, the custom 3D model of the first subject may be made to perform a particular stunt or a particular dance or the like that mimics a corresponding stunt or dance performed by the second subject in the motion capture video.

Figure 2:
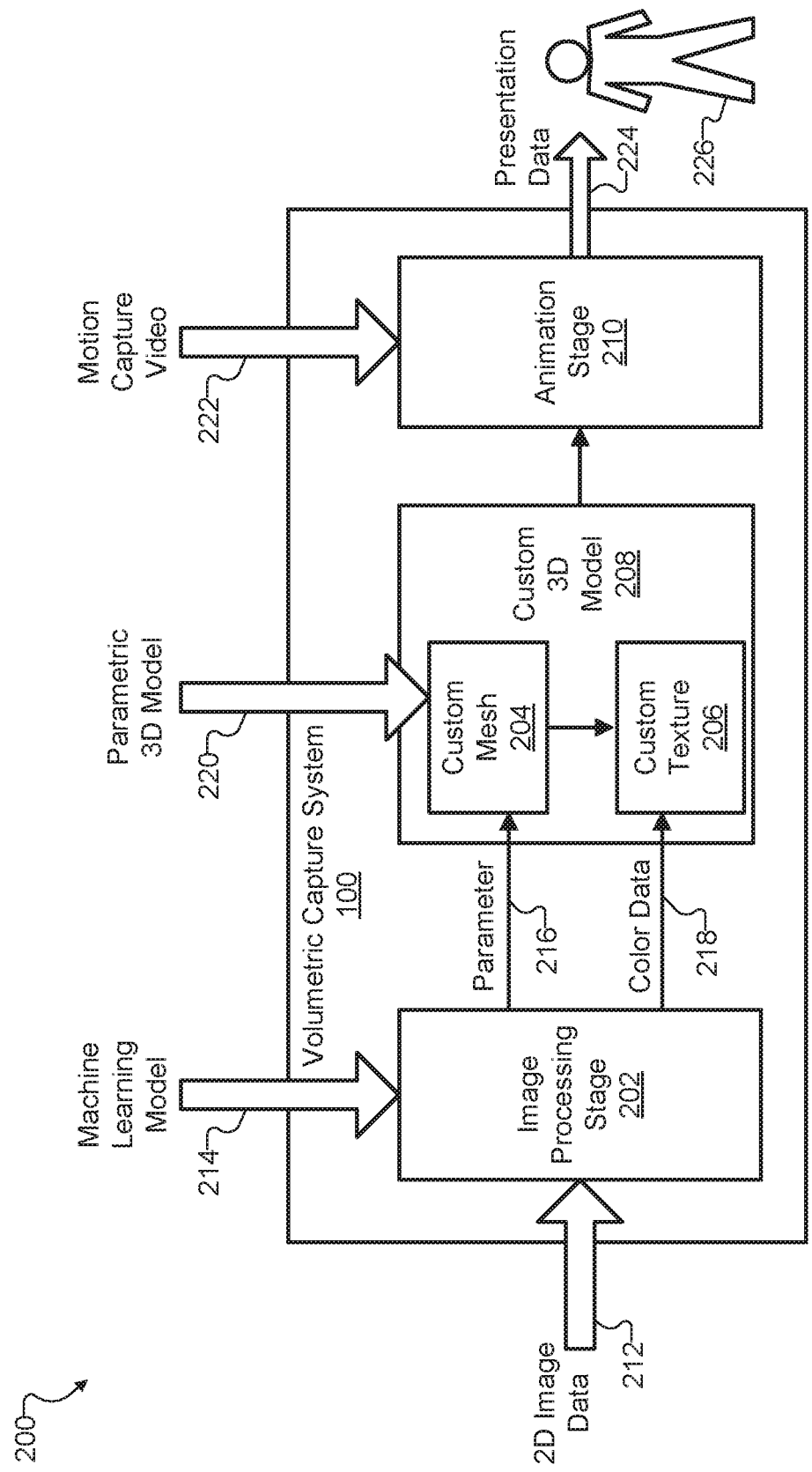
FIG. 2 shows an illustrative dataflow used by the volumetric capture system of FIG. 1 to generate an animated 3D model based on a 2D image according to embodiments described herein.

FIG. 2 shows an illustrative dataflow 200 used by system 100 to generate an animated 3D model based on a 2D image. Specifically, as shown, data may be processed within system 100 at an image processing stage 202 to form a custom mesh 204 and a custom texture 206 that are incorporated into a custom 3D model 208. Custom 3D model 208 may then be processed at an animation stage 210. As will be described in more detail below with reference to FIGS. 3-8, system 100 may input and output various types of data as the animated 3D model is generated according to principles described herein. For example, as shown in dataflow 200, image processing stage 202 may input a set of 2D image data 212 and a machine learning model 214 to thereby allow image processing stage 202 to produce a parameter 216 and a set of color data 218. Custom mesh 204 may input a parametric 3D model 220 that is used to form custom 3D model 208 by applying one or more parameters 216 to parametric 3D model 220. Animation stage 210 may then input a motion capture video 222 and output a set of presentation data 224 that is configured for presentation to a user 226. Each of the components illustrated in FIG. 2 will now be described in more detail with reference to FIGS. 3-8.

Figure 3:
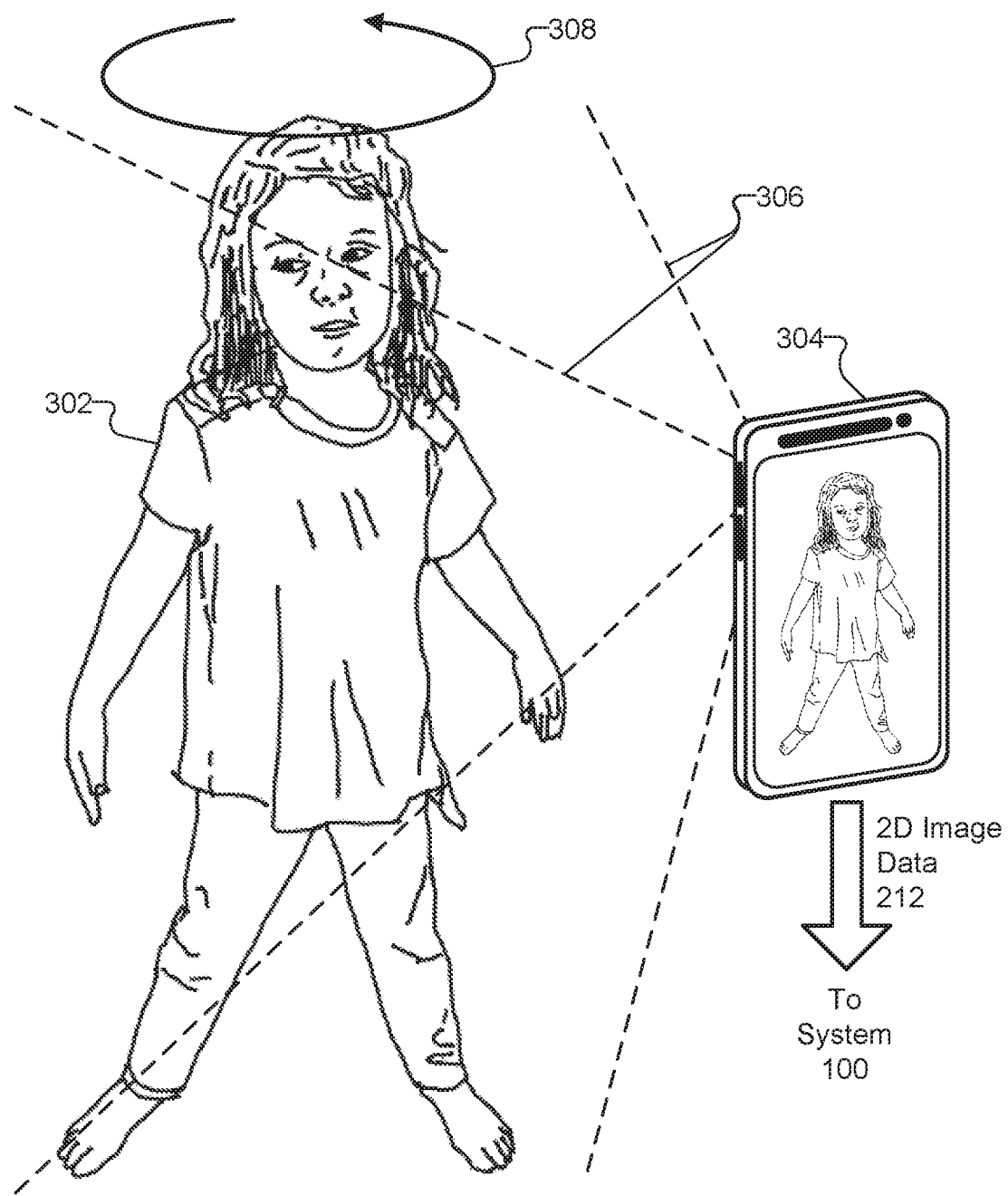
FIG. 3 shows illustrative aspects of how 2D image data is captured by an illustrative capture device according to embodiments described herein.

FIG. 3 shows illustrative aspects of how 2D image data 212 is captured by an illustrative capture device. As shown in FIG. 3, 2D imagery associated with a first subject 302 may be captured by a capture device 304 by aiming a field of view 306 of capture device 304 in the direction of the subject. In this example, the first subject 302 is shown to be a human subject, a young girl in this example. Accordingly, first subject 302 will also be referred to herein as "girl 302." It will be understood, as has been mentioned, that the human subject type of girl 302 is only an example, and that other types of people (e.g., boys, women, men, etc.) and/or other types of subjects (e.g., animals, inanimate objects, etc.) may fill the role of the first subject in other examples.

While capture device 304 is shown in FIG. 3 to be implemented as a mobile device (e.g., a smartphone that includes a camera with field of view 306), it will be understood that other types of capture devices (e.g., a camera device, a video camera device, etc.) may play the role of capture device 304 in other implementations. While an arrow labeled "2D image data 212" is shown to leave capture device 304 with the destination "To System 100," it will be understood, as mentioned above, that system 100 may be implemented by any suitable computing resources including by the resources of the mobile device implementing capture device 304. It thus follows that, in certain implementations, 2D image data 212 is not actually transmitted by the mobile device to another system or device, but, rather, is provided by a camera embedded within the mobile device to various computing resources (e.g., memory resources, processing resources, etc.) that are also embedded within the mobile device (i.e., within capture device 304). In other implementations, system 100 may be fully or partially implemented by a computing system that is separate from and communicatively coupled to capture device 304 (e.g., a cloud server, a MEC server, etc.), and 2D image data 212 may indeed be transmitted (e.g., by way of a network interface or other suitable communication interface) from capture device 304 to the separate computing system in the manner suggested by the arrow in FIG. 3.

System 100 may generate an animated 3D model of girl 302 based on very little 2D image data depicting girl 302. For instance, in certain examples, 2D image data 212 may represent only a single image of girl 302 captured from a single perspective (and, in certain examples, including only RGB data and not depth data). While examples involving such sparse data may not result in custom meshes and custom textures that are as detailed or as accurate as examples in which a greater wealth of data is provided, it is a significant advantage of methods and systems described herein that any 3D volumetric model at all can be created with such a small amount of input image data. As will be described in more detail below, these benefits are facilitated and/or made possible by the use of a parametric 3D model, machine learning technologies, and the novel ways these are employed in methods and systems described herein.

While it may be beneficial in certain scenarios and use cases to only require the single image of girl 302, it will be understood that greater amounts of 2D image data 212 (e.g., a plurality of 2D images depicting girl 302 from a plurality of different perspectives) may facilitate system 100 in generating a more accurate and detailed custom 3D model of girl 302. For example, capture device 304 may capture a 2D video that depicts girl 302 as girl 302 rotates or turns around in the manner suggested by arrow 308 (or in another suitable manner such as in the opposite direction) to provide capture device 304 with a view of girl 302 from multiple different perspectives. This 2D video may include a plurality of 2D image frames that include a particular 2D image, and in that way system 100 may be considered to access the particular 2D image as part of accessing the 2D video.

In certain implementations, system 100 may employ machine learning technology. Machine learning may be helpful for any amount of 2D image data 212, but may be particularly beneficial when 2D image data 212 is relatively sparse, such as a single 2D image. This is because machine learning technology may allow system 100 to process one or more 2D images depicting girl 302 to detect certain physical characteristics of girl 302 and to identify one or more parameters representative of such characteristics. For example, system 100 may identify a parameter representative of a characteristic of girl 302 by 1) accessing a machine learning model associated with the particular subject type; 2) semantically segmenting, using the machine learning model, one or more 2D images included within 2D image data 212 to distinguish a first component associated with the first subject from one or more additional components associated with the first subject; and 3) determining, based on a characteristic of the distinguished first component of the semantically segmented 2D image, the parameter representative of the characteristic of the first subject.

Figure 4:
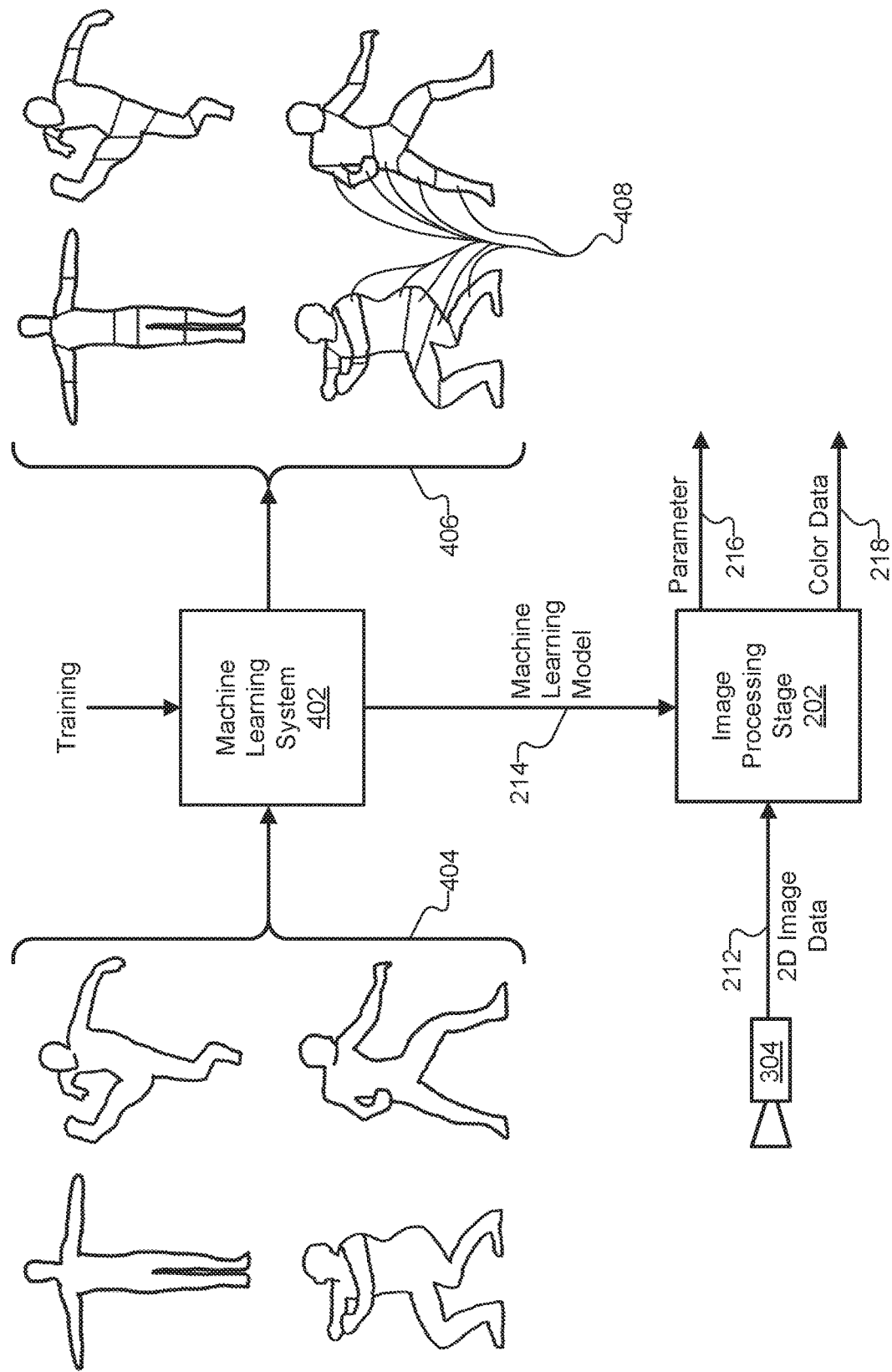
FIG. 4 shows illustrative aspects of how a machine learning model may be created and used according to embodiments described herein.

To illustrate, FIG. 4 shows illustrative aspects of one way that a machine learning model may be created and used by system 100 to generate an animated 3D model based on a 2D image according to principles described herein. Specifically, as shown, FIG. 4 depicts a machine learning system 402 that generates machine learning model 214 (the machine learning model illustrated in FIG. 2 above) based on input training data 404 and training that may involve human input (e.g., from expert annotators or the like). Machine learning system 402 may incorporate one or more machine learning networks configured to perform various types of machine learning tasks described herein. For instance, one machine learning network incorporated into machine learning system 402 may be a semantic segmentation network configured to semantically segment different components of the subject such as different body parts, different articles of clothing (for human subjects), and so forth. Another machine learning network incorporated into machine learning system 402 may be a joint detection network configured to identify various joints of the subjects regardless of how the subject is oriented (since certain types of subjects such as humans may orient themselves in a large number of different possible orientations).

While machine learning system 402 is illustrated as a single, monolithic system in FIG. 4, it will be understood that machine learning system 402 may represent a distributed system or a plurality of different interoperating machine learning networks and systems that are implemented in similar or different ways as one another. For example, a semantic segmentation network incorporated into machine learning system 402 may be implemented using an open source machine learning network provided for general-purpose use while a joint detection network incorporated into machine learning system 402 may be implemented using a proprietary machine learning network developed for special-purpose use as described herein. In such examples, it will be understood that training may be performed by different people and that input training data 404 and output training data 406 may represent separate training data sets that include different data and/or are used in different ways by the different types of machine learning networks.

Regardless of how machine learning system 402 is implemented, machine learning system 402 may produce machine learning model 214 and provide machine learning model 214 to system 100 at image processing stage 202 to help system 100 process one or more 2D images included within 2D image data 212 (received from capture device 304 as described above). For example, based on machine learning model 214, system 100 may process 2D image data 212 in an analogous way that machine learning system 402 has been trained to process images from input training data 404 to generate respective images of output training data 406. In this way, 2D image data 212 may be accurately and efficiently processed at image processing stage 202 to identify accurate and efficient parameters 216 and color data 218 that represent various characteristics of a subject depicted in 2D image data 212 (e.g., parameters and color data representing characteristics of girl 302). It will be understood that image processing stage 202 may also utilize other data accessible to system 100 in certain implementations, such as, for example, data representative of parametric 3D model 220.

In FIG. 4, machine learning model 214 generated by machine learning system 402 is shown to be associated with subjects of a human subject type. However, as mentioned above, other machine learning systems (or additional machine learning networks incorporated into machine learning system 402) may be configured to generate machine learning models associated with subjects of other subject types. For instance, a machine learning system may generate a machine learning model associated with a certain type of animal (or various types of animals), a certain type of inanimate object (or various types of inanimate objects), a certain type of human being (e.g., women, men, children, etc.), or the like.

Regardless of the subject type with which a machine learning model is associated, it may be the case that subjects of the subject type are able to change shape at various inflection points referred to herein as "joints." Such shape changing may be associated with non-rigid deformations that may potentially allow the subjects to take on a wide variety of shapes that may be difficult for a computer to accurately and efficiently process using explicit instructions in conventional computing models. While these types of explicit computing models may lead to undesirable and/or unpredictable results, machine learning processes described herein may allow computers to more accurately and efficiently process incoming image data. For example, joint detection machine learning processes may allow computers to accurately and efficiently recognize various different subjects in the wide variety of potential shapes and forms that may be encountered, while semantic segmentation machine learning processes may allow computers to accurately and efficiently distinguish different components of various subjects (e.g., different body parts, different articles of clothing, etc., for human subjects).

A particular joint of a body may join two or more segments (e.g., body parts) included in a set of segments of which a subject is composed. For example, for a human subject type, joints may join two or more body parts and may be found at the neck, shoulders, elbows, wrists, hips, knees, ankles, knuckles, and/or various other parts of the body. It is noted that the term "joint" as used herein may overlap with, but may differ significantly in some respects, from how the term "joint" may be used in a medical or anatomically technical sense. A subject of a particular subject type may include segments (e.g., body parts) and joints that correspond to analogous sets of segments and joints of other subjects of the same particular subject type. Accordingly, each subject of the particular subject type may be able to non-rigidly deform in similar ways such that a machine learning model trained for the particular subject type may provide significant insights into non-rigid deformations that may potentially be encountered by system 100 but that it may not be practical or possible to explicitly program into system 100.

As mentioned above, one way that 2D image data 212 may be processed using machine learning model 214 at image processing stage 202 is by semantically segmenting (using machine learning model 214) a first component associated with the subject to distinguish the first component from other components associated with the subject. Such semantic segmentation may result, for example, in the generation of a 2D segmentation dataset for the subject depicted in 2D image 212, as will be described and illustrated in more detail below. To perform semantic segmentation of a 2D image, system 100 may correlate each pixel in the 2D image with a particular segmentation class associated with a particular component of the subject. For instance, for the human subject type, segmentation classes may include, without limitation, a background class, a hat class, a hair class, a glove class, an eyeglasses or sunglasses class, an upper-clothes class, a dress class, a coat class, a socks class, a pants class, a torso-skin class, a scarf class, a skirt class, a face class, a left-arm class, a right-arm class, a left-leg class, a right-leg class, a left-shoe class, a right-shoe class, and/or more or fewer such classes related to body parts and/or clothing items of the human subject type as may serve a particular implementation. Additionally, the work system 100 does at image processing stage 202 may include assigning a respective component label (e.g., a body part label) to each segmented component represented in the 2D segmentation dataset, such that the identification of parameters representative of characteristics of the subject may be performed based on the respective component labels assigned to each segmented component.

To illustrate, images included within training input data 404 show various human bodies in various poses (i.e., various non-rigid deformations in which different joints of the bodies are configured to provide different shapes for all the body parts of the bodies). Machine learning system 402 (including each of potential multiple machine learning networks incorporated therein) may be trained using automated processes and human input to create a library of human-approved interpretations of the image referred to as "ground truth" interpretations. In some examples, the ground truth interpretations may segment the bodies and identify joint locations for bodies posed in dramatically different configurations. For example, images included within training output data 406 show illustrative ground truth interpretations of body part segmentations of each respective image of training input data 404. In the images of data 406, various components 408 (i.e., body parts) such as the head, torso, upper arm (above the elbow), lower arm (below the elbow), hips, upper legs (above the knee), and lower legs (below the knee), are segmented on each image of each subject using lines that have been placed by machine learning system 402 during the training process. It will be understood that these segmentations are shown only by way of illustration, and that various different segmentations (including segmentations associated with any of the segmentation classes described herein) may be used as may serve a particular implementation. The segmentations may be accounted for in the mathematical machine learning model 214 generated by machine learning system 402. As such, at image processing stage 202, system 100 may use machine learning model 214 to accurately and efficiently perform semantic segmentation of 2D images that are included within 2D image data 212 and that have not been previously analyzed by a human as part of the training process.

In some examples, system 100 may label each component (e.g., including each joint in certain examples) at image processing stage 202 as the components are identified and segmented based on machine learning model 214. Such labels may be propagated from frame to frame of a 2D video implementing 2D image data 212 (in examples where 2D image data 212 includes such a video) and/or from 2D to 3D in various ways that serve to help identify one or more parameters 216 and/or generate color data 218. While the human subjects shown in FIG. 4 include a few illustrative joints and body parts, it will be understood that certain models of human bodies and/or other body types may include more or fewer joints and body parts. As one example, a human hand may be modeled in much more detail than illustrated in FIG. 4 and may include a large number of joints and connected body parts that allow that hand to non-rigidly deform in various ways that can efficiently be modeled using machine learning technology.

The training of machine learning system 402 to make it possible for machine learning model 214 to be generated, provided, updated, and so forth, may be performed using a combination of human input (e.g., by expert annotators, by open source contributors, etc.) and novel automation processes to make efficient use of the human contributors' time and ability in the creation of ground truth interpretations. Various details of how this training process may be implemented, as well as other details related to how machine learning technologies may be employed in the capture and processing of real-world image data and in the creation of 3D models, is described in co-pending U.S. patent application Ser. No. 16/830,848, filed Mar. 26, 2020, and entitled "METHODS AND SYSTEMS FOR APPLYING MACHINE LEARNING TO VOLUMETRIC CAPTURE OF A BODY IN A REAL-WORLD SCENE" (the "co-pending application"). The content of this co-pending application is hereby incorporated by reference in its entirety.

Machine learning model 214 may provide various types of insights to the benefit of system 100 once machine learning system 402 is properly trained. For example, joint detection insights related to skeletal locations and features for a particular subject type (e.g., the human subject type) may include insights associated with the position of major joints (e.g., elbows, knees, waist, etc.), the locations of limbs (e.g., hand and foot locations, etc.), the locations of primary facial features (e.g., expressions formed using facial muscles around the eyes, nose, mouth, etc.), and so forth. As another example, semantic segmentation insights may be provided that relate to which components of the subject (e.g., body parts, clothing articles, etc.) are present and how they are oriented. Based on these insights, machine learning model 214 may enable system 100 to generate dense per-pixel annotations that map individual pixels to specific components of the subject. For example, every pixel in a 2D image 208 may be determined to map to the face, arms, legs, shirt, pants, or another such component of girl 302 (from a plurality of segmentation classes as described above) depicted by a 2D image included in 2D image data 212 (or to the background).

Whether the 2D image data 212 accessed by system 100 includes only a single 2D image, a handful of 2D images (e.g., a few frames of a 2D video, a few still shots from different angles, etc.), or a longer segment of a full 2D video (e.g., a video depicting girl 302 turning all the way around so as to present herself to field of view 306 from every perspective, as illustrated by arrow 308 in FIG. 3), machine learning model 214 may be employed by system 100 at image processing stage 202 to identify, based on 2D image data 212, one or more parameters 216 representative of various characteristics of girl 302. Additionally, color data 218 representative of the external appearance of girl 302 may be identified and processed (e.g., decoded, formatted, passed through unchanged, etc.) based on 2D image data 212.

Figure 5:
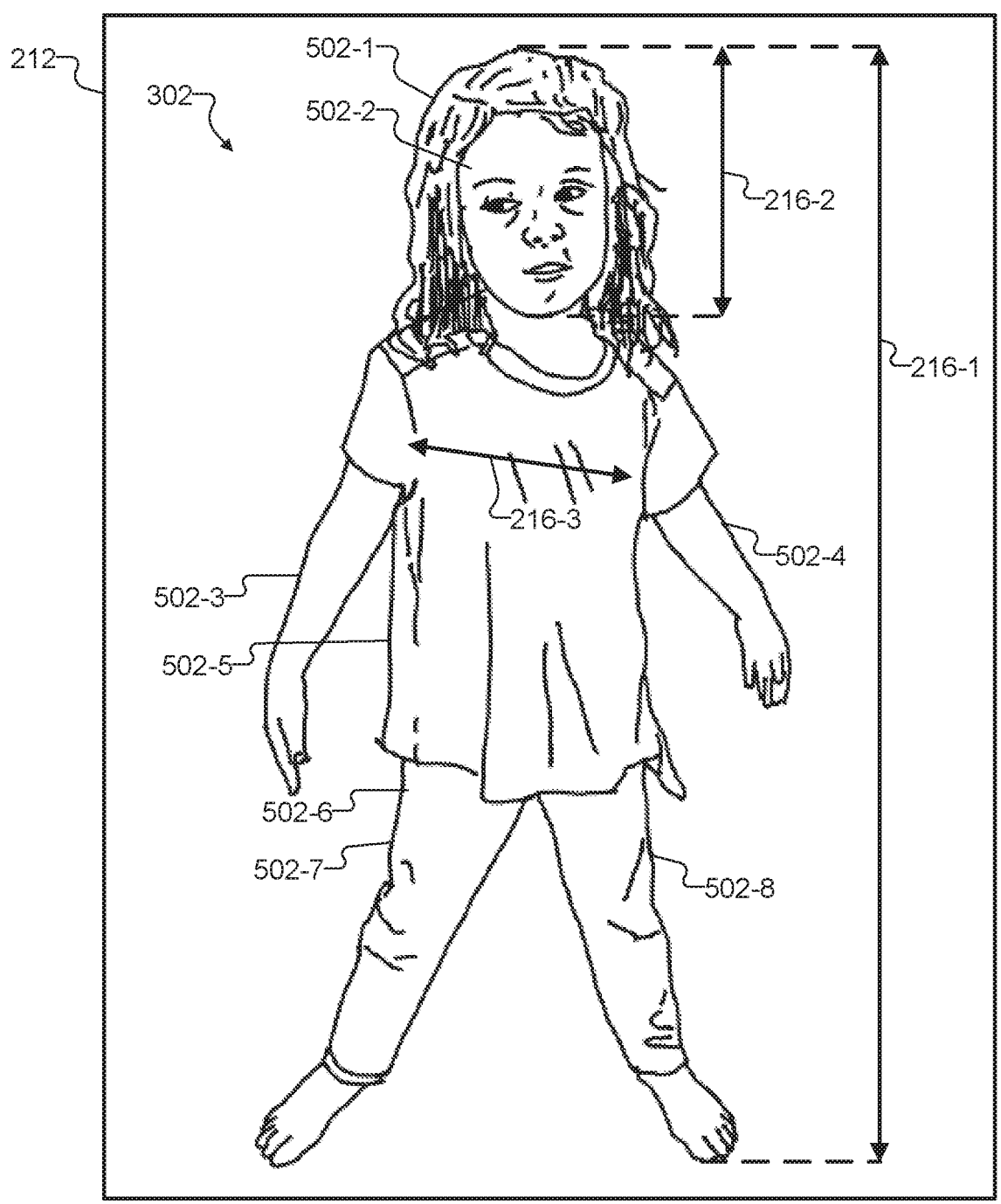
FIG. 5 shows an illustrative 2D image that has been semantically segmented to facilitate identifying a parameter representative of a characteristic of a subject according to embodiments described herein.

To illustrate, FIG. 5 shows a particular 2D image represented by 2D image data 212 and labeled as 2D image 212 in FIG. 5. As illustrated, 2D image 212 has been semantically segmented to facilitate identifying various parameters 216 representative of various characteristics of first subject 302 (i.e., girl 302). While not explicitly illustrated in the same manner as shown above with the segmented components of training output data 408 (i.e., with explicit segmentation lines drawn to separate each component or body part), reference numbers in FIG. 5 will be understood to indicate that 2D image 212 has been semantically segmented to distinguish each of various components 502 (e.g., components 502-1 through 502-15) of girl 302. For example, FIG. 5 shows a hair component 502-1, a face component 502-2, respective right-arm and left-arm components 502-3 and 502-4, an upper-clothes component 502-5, a pants component 502-6, and respective left-leg and right-leg components 502-7 and 502-8, all of which have been semantically segmented by system 100 at image processing stage 202 based on machine learning model 214.

Once machine learning model 214 has been employed to semantically segment the depiction of girl 302 (e.g., in the manner shown in FIG. 5) and to detect the joints of girl 302, system 100 may identify any parameters 216 as may serve to represent a characteristic of girl 302 in a particular implementation. To provide a few examples by way of illustration, FIG. 5 shows a parameter 216-1 representative of a height of girl 302 that may be computed as a distance from the head to the feet of girl 302. FIG. 5 also shows a parameter 216-2 representative of a head size of girl 302. As girl 302 is a small child, her head size compared to her total height may be very different from the ratio of head size to total height of other types of people such as grown women and men. As yet another example, FIG. 5 shows a parameter 216-3 representative of a chest girth of girl 302, which may provide one potential indication of the build of girl 302.

Referring back to FIG. 2, any of the specific parameters 216-1 through 216-3 that have been illustrated and described, as well as various other suitable parameters 216 that are not explicitly illustrated or described herein, may be used by system 100 to instantiate custom mesh 204 from parametric 3D model 220. Parametric 3D model 220 may be generated in any suitable way. For example, parametric 3D model 220 may be based on a combination of synthetic data and real human scans. Additionally or alternatively, parametric 3D model 220 may, in certain examples, employ principal component analysis ("PCA") techniques (which may allow for low-dimensional shape space to be created), linear skinning techniques (which may allow parametric 3D model 220 to be deformed into arbitrary poses using skeletal animation), and/or any other suitable techniques or combination thereof.

As such, parametric 3D model 220 may serve as a generic model of the subject type in question (e.g., the human subject type in the ongoing example provided here of girl 302) that may take the form of various subjects of the subject type when different parameters are applied. For example, based on parameters 216-1 through 216-3, parametric 3D model 220 may be used to generate custom mesh 204 to take the form of a human being who is relatively short (i.e., having the height indicated by parameter 216-1); who has a relatively large, childlike head (i.e., a head with the size indicated by parameter 216-2); and who has a particular girth (i.e., the girth indicated by parameter 216-3).

Figure 6:
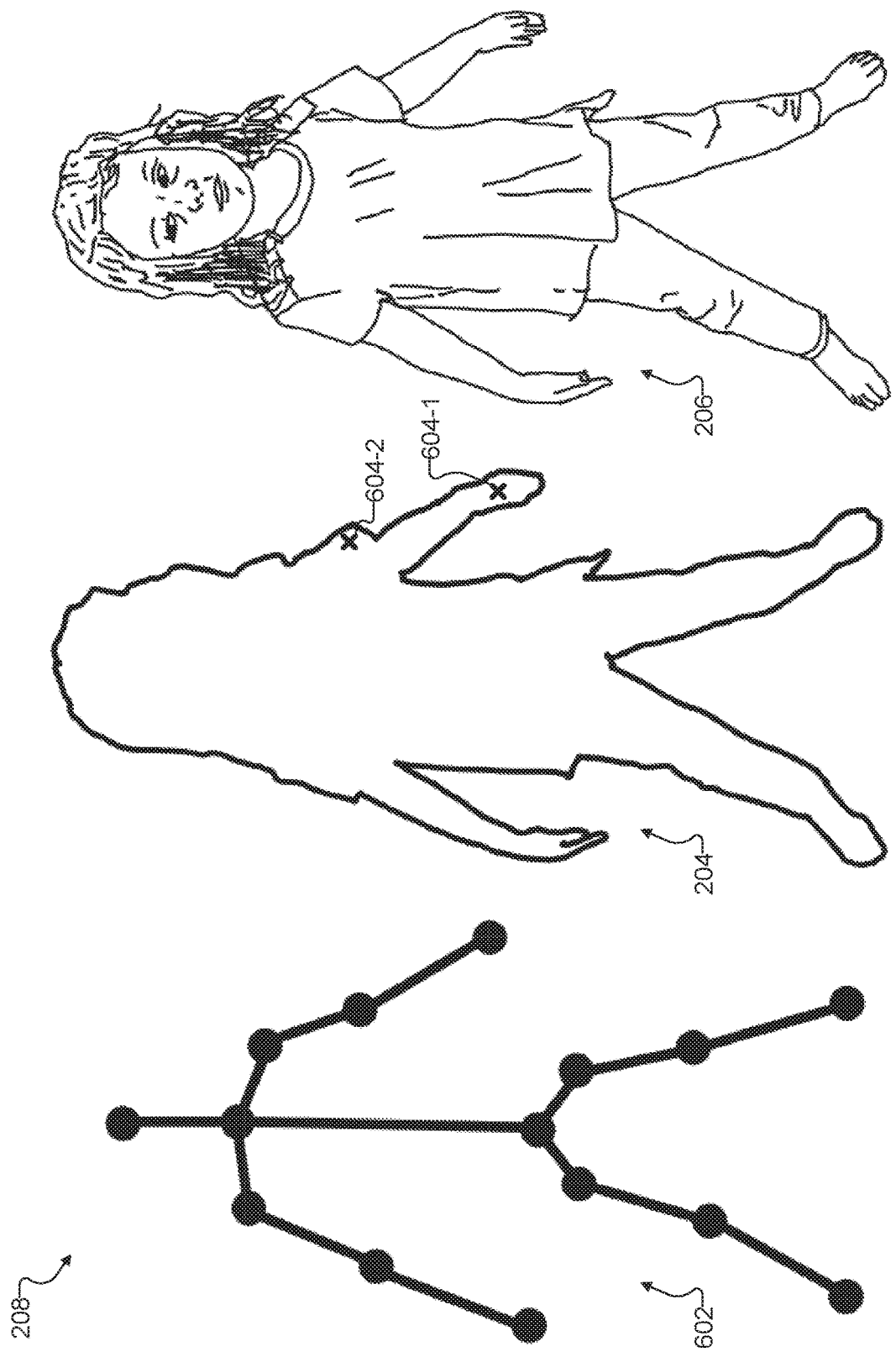
FIG. 6 shows an illustrative skeletal model, an illustrative mesh, and an illustrative texture, all of which are incorporated into a custom 3D model of a subject according to embodiments described herein.

Custom mesh 204 and custom texture 206 (which is based on custom mesh 204 and color data 218, as will be described in more detail below) are shown in FIG. 2 to both be incorporated into custom 3D model 208. To further illustrate this relationship, FIG. 6 shows an illustrative skeletal model 602, an illustrative implementation of custom mesh 204, and an illustrative implementation of custom texture 206, all of which may be incorporated into an implementation of custom 3D model 208 of a subject (e.g., of girl 302 in this example).

Skeletal model 602 is shown to include a plurality of model bones (i.e., the line segments) that are connected by a set of joints (i.e., the small circles) that are positioned at respective 3D joint locations. For example, the 3D joint locations may be determined based on 2D joint locations determined from one or more 2D images included in 2D image data 212 captured by capture device 304 as described above. The model bones may be associated with different body parts that have been segmented and labeled by system 100 in any of the ways described above, and it will be understood that the particular joints and model bones illustrated in FIG. 6 are illustrative only, and that various examples may implement more, fewer, or different joints and model bones than those illustrated for skeletal model 602.

Custom mesh 204 may be formed around skeletal model 602 based on the application of various parameters 216 to parametric 3D model 220. For example, parametric 3D model 220 may include each of the joints and model bones of skeletal model 602 (e.g., a plurality of joints shared by all subjects of the particular subject type) and allow these to be customized based on parameters 216. In some examples, parametric 3D model 220 may also include constraint definitions to define how various joints and model bones are expected to operate in real subjects. For example, certain joints of parametric 3D model 220 (e.g., knee joints, elbow joints, etc.) may be assigned respective constraints defining a manner in which the particular joints are allowed to move (e.g., the knees and elbows being able to bend in the proper direction of human knees and elbows but not being able to bend in other arbitrary directions, etc.).

Custom mesh 204 may be formed from a plurality of interconnected vertices associated with the various components of the subject (e.g., the various body parts of girl 302). For example, two vertices 604-1 and 604-2 are explicitly called out in FIG. 6 to illustrate aspects described in more detail below. In some examples, interconnections between hundreds or thousands of vertices 604 (including the illustrative vertices 604-1 and 604-2 and many other vertices 604) may form a large number of geometric shapes (e.g., triangles) that form the 3D volumetric mesh for custom 3D model 208. Such vertices and the interconnections between them may form all components of a subject including, in the human subject example of girl 302, the hair and skin of the girl as well as the clothing the girl is wearing.

Accordingly, while not explicitly illustrated in FIG. 6, it will be understood that custom mesh 204 may be associated with a 2D segmentation dataset and/or various labels or annotations that indicate and distinguish different vertices or components of the subject modeled by custom 3D model 208. For example, vertices associated with body parts of girl 302 such as the head, torso, arms, legs, and so forth may each be associated with metadata labels or annotations designating them as such. Along with being based on certain identified parameters 216 and a corresponding instantiation of parametric 3D model 220 to which such parameters are applied, custom mesh 204 may also be made to conform as closely as possible to the subject (e.g., girl 302) by utilizing joints mapped from 2D images to 3D locations by the machine learning techniques described above. For example, system 100 may extract a 3D location of each joint incorporated into skeletal model 602 and custom mesh 204 by mapping joints one-to-one from 2D image data 212 to parametric 3D model 220. The constraints on these joints described above facilitates accurate joint mapping from 2D to 3D, thereby helping make custom 3D model 208 resemble the subject accurately and realistically. Additionally, temporal consistency of the model may be ensured for implementations where multiple frames are included in 2D image data 212 by considering not only joint locations from a current frame but from multiple frames preceding the current frame.

Another aspect that may be accounted for in the generation of custom mesh 204 is how tightly or loosely coupled each vertex 604 of custom mesh 204 is to skeletal model 602. This aspect may be accounted for using displacement parameters assigned to each vertex. As one example, a vertex associated with a lean body part such as vertex 604-1 (e.g., a vertex associated with skin on the hand of girl 302) may be determined to remain relatively tightly coupled with the underlying skeletal structure, and thus may be assigned a relatively low displacement parameter. In contrast, a vertex associated with a more fleshy body part or with loose-fitting clothing such as vertex 604-2 (e.g., a vertex associated with a loose-fitting sleeve of the girl's shirt) may be determined to be loosely coupled with the underlying skeletal structure, and thus may be assigned a relatively high displacement parameter.

More particularly, if the particular subject type is a human subject type and the first subject is a particular person (e.g., girl 302 in this example), system 100 may distinguish a first component (e.g., the girl's hand) from one or more additional components (e.g., other parts of the girl's body and the background of the 2D image). System 100 may then form custom mesh 204 from a plurality of interconnected vertices 604 that includes vertex 604-1 associated with the first component (i.e., a vertex on the girl's hand), and may generate custom 3D model 208 by assigning a first displacement parameter (e.g., a relatively low displacement parameter) to vertex 604-1 to indicate how loosely coupled vertex 604-1 is with the skeletal structure of custom 3D model 208. Moreover, if the one or more additional components in the 2D image include a second component that is an article of clothing worn by the particular person (e.g., the loose-fitting shirt worn by girl 302 in this example), the plurality of interconnected vertices forming the custom mesh may further include vertex 604-2 associated with the second component. The generating of custom 3D model 208 may thus also include assigning a second displacement parameter (e.g., a relatively high displacement parameter) to vertex 604-2 to indicate how loosely coupled vertex 604-1 is with the skeletal structure. Because the shirt is more displaced from the skeletal structure and more free to move with respect to that skeletal structure than, for example, the skin on the hand, the second displacement parameter assigned to vertex 604-2 may be greater than the first displacement parameter assigned to vertex 604-1.

It will be understood that vertices 604-1 and 604-2 and the displacement parameters described above in association with these vertices are only examples. In various implementations, all types of vertices from all over a custom mesh may be defined with different types of displacement parameters defining the shape of the vertices in relation to the skeletal structure. For example, a custom 3D model representative of an overweight person may include displacement parameters that allow for the fleshy areas of the person's torso, arms, and other areas to have a lifelike appearance that may be different from comparable areas of a lean person whose flesh is more tightly coupled to his or her bones. Similarly, displacement parameters may be used to differentiate a custom 3D model representing people wearing loose or bulky clothing versus those wearing tighter or more minimal clothing, people having longer hair versus those with shorter hair, and so forth.

As indicated by the arrow from custom mesh 204 to custom texture 206 in FIG. 2, custom texture 206 may be generated based on custom mesh 204 (e.g., based on labels and annotations assigned to vertices of custom mesh 204), as well as based on color data 218 captured in the 2D image(s) included within 2D image data 212 from capture device 304. In this manner, custom mesh 204 may be textured with custom texture 206 to complete custom 3D model 208. Color data from various different 2D images included in 2D image data 212 may be blended in any suitable way to form a smooth custom texture 206 for custom 3D model 208.

One aim of system 100 while texturing custom mesh 204 may be to create a smooth, seamless texture. However, this target may be difficult to achieve if the capture environment is not carefully controlled in terms of lighting, objects passing through, movements of the subject, glares on the capture device, and so forth. Even if these types of aspects (as well as sensor attributes of capture device 304 and/or other such factors) may be controlled in certain implementations or scenarios, it may be the case in other implementations or scenarios that such aspects are not tightly controlled. Accordingly, system 100 may perform operations to average colors captured by different capture devices in ways that provide consistent and accurately blended colors and that avoid visible seams as much as possible. Certain such operations are described in detail in the provisional application and the co-pending application, as well as in FIG. 7, which will now be described.

Figure 7:
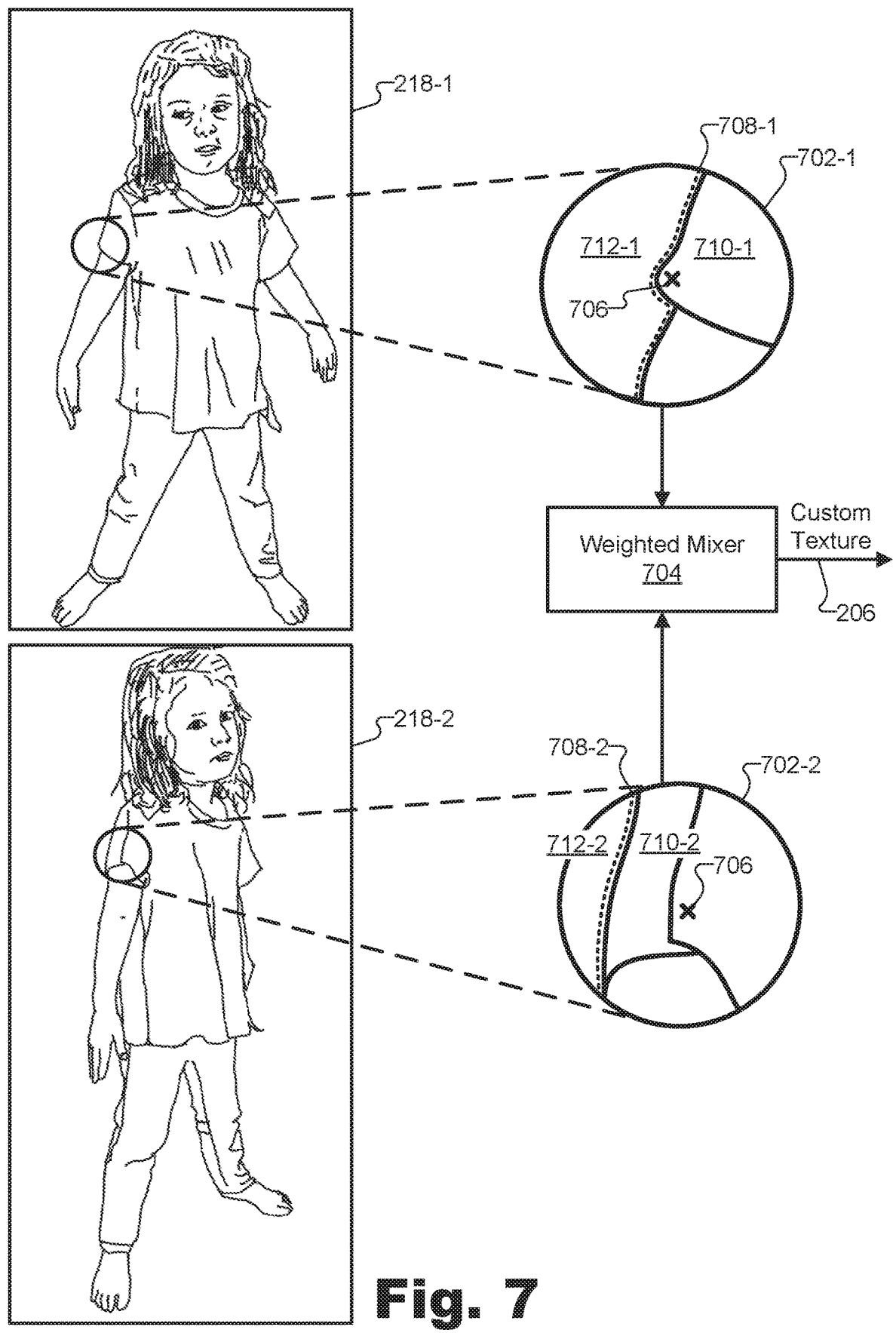
FIG. 7 shows illustrative aspects of how a custom texture may be generated for application to a custom mesh of a custom 3D model of a subject according to embodiments described herein.

FIG. 7 shows illustrative aspects of how custom texture 206 may be generated for application to custom mesh 204 of custom 3D model 208 of subject 302. As shown in FIG. 7, color data images 218 (provided by image processing stage 202 based on 2D image data 212) may include various depictions of girl 302 as she rotates in front of capture device 304 to allow capture device 304 to capture 2D images from various perspectives. Specifically, a color data image 218-1 is shown to depict girl 302 from a first perspective (e.g., a straight-on perspective), while a color data image 218-2 is shown to depict girl 302 from a second, slightly different perspective (e.g., a perspective where the girl has turned slightly to her left). As shown, the first part of girl 302 captured from the first perspective in color data image 218-1 is distinct from and overlapping with the second part of girl 302 captured from the second perspective in color data image 218-2.

In FIG. 7, respective zoomed-in portions 702 (i.e., portion 702-1 of color data image 218-1 and portion 702-2 of color data image 218-2) are broken out to illustrate how a weighted mixer 704 may generate custom texture 206 as a weighted blend of color data that avoids unwanted seam artifacts associated with the boundary of different color data images used to generate custom texture 206. To illustrate, a particular point 706 on the clothing of girl 302 is shown in both portion 702-1 and 702-2. In portion 702-1, point 706 is shown to be near a boundary 708-1 where silhouette pixels 710-1 (i.e., pixels associated with girl 302) meet background pixels 712-1 (i.e., pixels associated with imagery other than girl 302). Due to imprecision introduced by lighting conditions and/or other factors as mentioned above, it may not be possible for system 100 to perfectly identify every silhouette pixel 710-1 (i.e., every pixel associated with girl 302 on the right side of boundary 708-1) for use in generating custom texture 206, while also perfectly avoiding inclusion of every background pixel 712-1 (i.e., every pixel associated with the background on the left side of boundary 708-1). As a result, if custom texture 206 were to generate custom texture 206 in full reliance on color data image 218-1, point 706 and other points near boundary 708-1 may have a greater likelihood of introducing errors into custom texture 206 due to their proximity to the boundary. Such errors may result in undesirable artifacts such as visible "seams" that run along custom 3D model 208 and that reveal the boundaries of each 2D image used to generate the texture, rather than seamlessly blending the different 2D images together.

To address this potential issue, system 100 may employ weighted mixer 704, which may be configured to generate custom texture 206 (i.e., the custom texture that is to be applied to custom mesh 204) based on a weighted mix of imagery of color data images 218-1 and 218-2 in which: 1) imagery of color data image 218-1 that is nearer to boundary 708-1 is weighted less heavily than imagery of color data image 218-1 farther from boundary 708-1, and 2) imagery of color data image 218-2 nearer a boundary 708-2 is weighted less heavily than imagery of color data image 218-2 farther from boundary 708-2.

Referring to point 706, FIG. 7 illustrates how this type of weighted mixing reduces undesirable seam artifacts. While point 706 is near boundary 708-1 in portion 702-1 of color data image 218-1, point 706 is not particularly close to boundary 708-2 in portion 702-2 of color data image 218-2. To the contrary, in portion 702-2, point 706 is shown to be a relatively safe distance from the boundary 708-2 where silhouette pixels 710-2 associated with girl 302 meet background pixels 712-2 not associated with girl 302. As a result, even if system 100 fails to perfectly distinguish every silhouette pixel 710-2 from every background pixel 712-2 along boundary 708-2 when generating custom texture 206, pixels associated with point 706 are far enough away from boundary 708-2 that they have a relatively low risk being in error (in contrast to the case with portion 702-1 described above). Accordingly, weighted mixer 704 may grant more weight to color data image 218-2 than to color data image 218-1 for point 706 and other points proximate to point 706.

Of course, points that are near boundary 708-2 in color data image 218-2 may not be given much weight by weighted mixer 704 compared to other color data images (not explicitly shown in FIG. 7) where girl 302 has turned further such that these points are safely positioned away from any boundary where errors are more likely to occur. As such, in a scenario where girl 302 has turned a full 360° such that color data images are available from perspectives on all sides, system 100 should be able to use weighted mixer 704 to represent the color of every point largely based on data from a color data image where the point is not near a boundary of the silhouette. In addition to this approach, system 100 may be configured to take advantage of machine learning techniques to improve the outcome, particularly where relatively few color data images 218 are available.

Referring back to FIG. 2, dataflow 200 shows that, once created, custom 3D model 208 may be processed at animation stage 210 together with motion capture video 222 to form presentation data 224. Presentation data 224 may be video data, for example, that depicts the first subject (e.g., girl 302) performing motions that the first subject has not necessarily actually performed, but that are instead performed by a second subject (e.g., another person) depicted in motion capture video 222. User 226 may represent any person who watches or otherwise uses or experiences presentation data 224. For example, if the first subject is a person, user 226 may be the first subject herself or himself (e.g., girl 302) or an acquaintance of the first subject who has directed system 100 to capture and process 2D image data and to generate presentation data 224.

Figure 8:
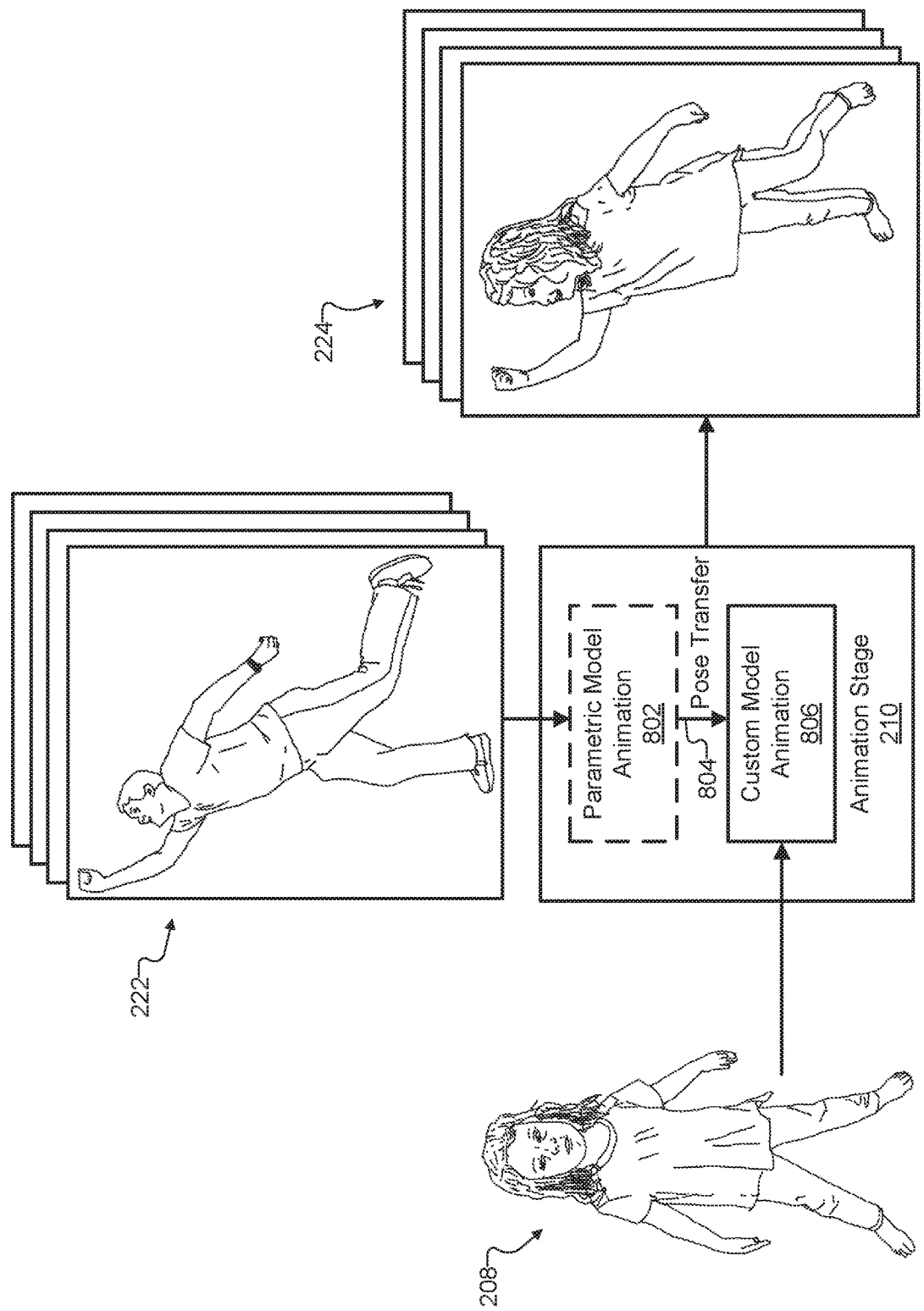
FIG. 8 shows illustrative aspects of how a custom 3D model may be animated according to embodiments described herein.

To more fully illustrate these principles, FIG. 8 shows illustrative aspects of how custom 3D model 208 may be animated at animation stage 210 of system 100. As has been described, custom 3D model 208 may be generated from 2D image data 212 (e.g., a single image, a plurality of images, a video image, etc.) where subject 302 poses for the model creation. For example, as shown, girl 302 may not perform any special motion for the formation of custom 3D model 208 other than standing in front of capture device 304, rotating in a circle to allow capture device 304 to capture 2D imagery from more perspectives, and so forth. Despite the simplicity of this motion by subject 302, however, system 100 may animate custom 3D model 208 at animation stage 210 to generate presentation data 224 which, as shown, causes custom 3D model 208 to perform a particular motion performed by a second subject in motion capture video 222.

As long as the second subject is of the same subject type as the first subject (e.g., as is the case in this example since girl 302 and the man depicted in motion capture video 222 are both human beings with analogous joints, body parts, etc.), system 100 may animate custom 3D model 208 to perform any motion as may be performed by the second subject. As such, FIG. 8 shows that girl 302 may be depicted as performing a dance motion that she never actually performed in the real world based on an analogous dance motion performed by a grown man as depicted in motion capture video 222. As shown in FIG. 8, the first and second subjects may, in some examples, be distinct subjects of the same subject type. In this example, for instance, the subjects are distinct people with various dissimilarities (e.g., different sizes, different proportions, different ages, different genders, etc.) but with certain aspects (e.g., basic joints and body part configurations) that are similar enough that the animation can be performed. It will be understood, however, that in other examples, the first and second subjects could be the same person (e.g., a model of a particular person could be made to mirror behavior depicted in a motion capture video of that person captured at a different time), or two people that have more similarities (e.g., two men of approximately the same size and build, etc.).

In some examples, motion capture video 222 may be selected from a library of motion capture videos. For example, such a library could include a variety of different dances set to different songs, a variety of action stunts performed using different props or scenery, or the like.

In some examples, system 100 may perform, at animation stage 210, a parametric model animation 802 that is applied, by way of a pose transfer 804, to a custom model animation 806. Specifically, in these examples, system 100 may first animate parametric 3D model 220 based on motion capture video 222 (e.g., a video that is also captured by a single capture device such as capture device 304 or another capture device) to cause parametric 3D model 220 to perform the motion performed by the second subject in motion capture video 222. In certain implementations, parametric model animation 802 may be performed ahead of time (e.g., before requested by user 226) and the results may be stored in a database or the like. For example, in implementations involving a library of motion capture videos 222, respective parametric model animations 802 associated with each motion capture video 222 may be stored in connection with the library in a database. The animating of custom 3D model 208 (i.e., custom model animation 806) of subject 302 may include performing the pose transfer operation of pose transfer 804 to direct custom 3D model 208 to emulate a pose of parametric 3D model 220 as parametric 3D model 220 performs the motion performed by the second subject.

While parametric model animation 802 may be rendered at an earlier point in time, custom model animation 806 may be performed on demand at a time requested by user 226. By using the pose transfer operation, custom model animation 806 may be performed quickly, such as in real time or near real time as the subject is being scanned for modeling or immediately thereafter. In other implementations, as indicated by the dashed line around parametric model animation 802, the preprocessing of parametric model animation 802 and the pose transfer operation of pose transfer 804 may be omitted from the process and system 100 may directly perform custom model animation 806 based on motion capture video 222 at animation stage 210.

Figure 9:
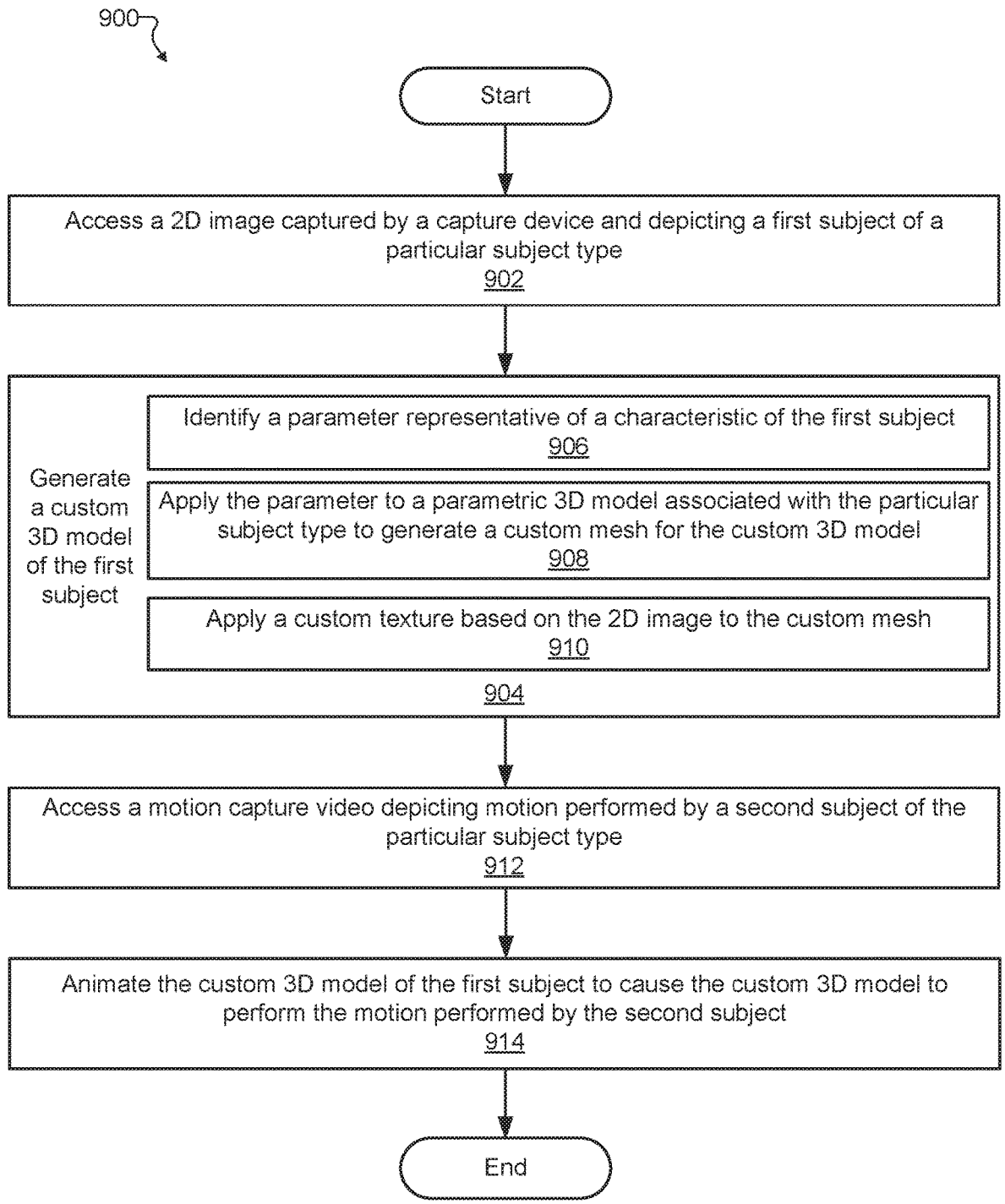
FIG. 9 shows an illustrated method for generating an animated 3D model based on a 2D image according to embodiments described herein.

FIG. 9 shows an illustrated method 900 for generating an animated 3D model based on a 2D image. While FIG. 9 illustrates illustrative operations according to one embodiment, other embodiments may omit, add to, reorder, and/or modify any of the operations shown in FIG. 9. One or more of the operations shown in FIG. 9 may be performed by a volumetric capture system such as system 100, any components included therein, and/or any implementation thereof.

In operation 902, a volumetric capture system may access a 2D image captured by a capture device. For example, the 2D image may depict a first subject of a particular subject type. Operation 902 may be performed in any of the ways described herein.

In operation 904, the volumetric capture system may generate a custom 3D model of the first subject. Operation 904 may be performed in any of the ways described herein, including, for example, by performing operations 906 through 910.

In operation 906, the volumetric capture system may identify a parameter representative of a characteristic of the first subject. For example, the volumetric capture system may identify the parameter based on the captured 2D image depicting the first subject that is accessed at operation 902. Operation 906 may be performed in any of the ways described herein.

In operation 908, the volumetric capture system may apply the parameter to a parametric 3D model to generate a custom mesh for the custom 3D model. The parametric 3D model may be associated with the particular subject type. Operation 908 may be performed in any of the ways described herein.

In operation 910, the volumetric capture system may apply a custom texture to the custom mesh. For example, the custom texture may be based on the captured 2D image accessed at operation 902. Operation 910 may be performed in any of the ways described herein.

In operation 912, the volumetric capture system may access a motion capture video depicting motion performed by a second subject of the particular subject type. Operation 912 may be performed in any of the ways described herein.

In operation 914, the volumetric capture system may animate the custom 3D model generated at operation 904 (i.e., by way of operations 906-910) based on the motion capture video accessed at operation 912. In this way, for example, the volumetric capture system may cause the custom 3D model to perform the motion performed by the second subject. Operation 914 may be performed in any of the ways described herein.

In certain embodiments, one or more of the processes described herein may be implemented at least in part as instructions embodied in a non-transitory computer-readable medium and executable by one or more computing devices.

In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 10:
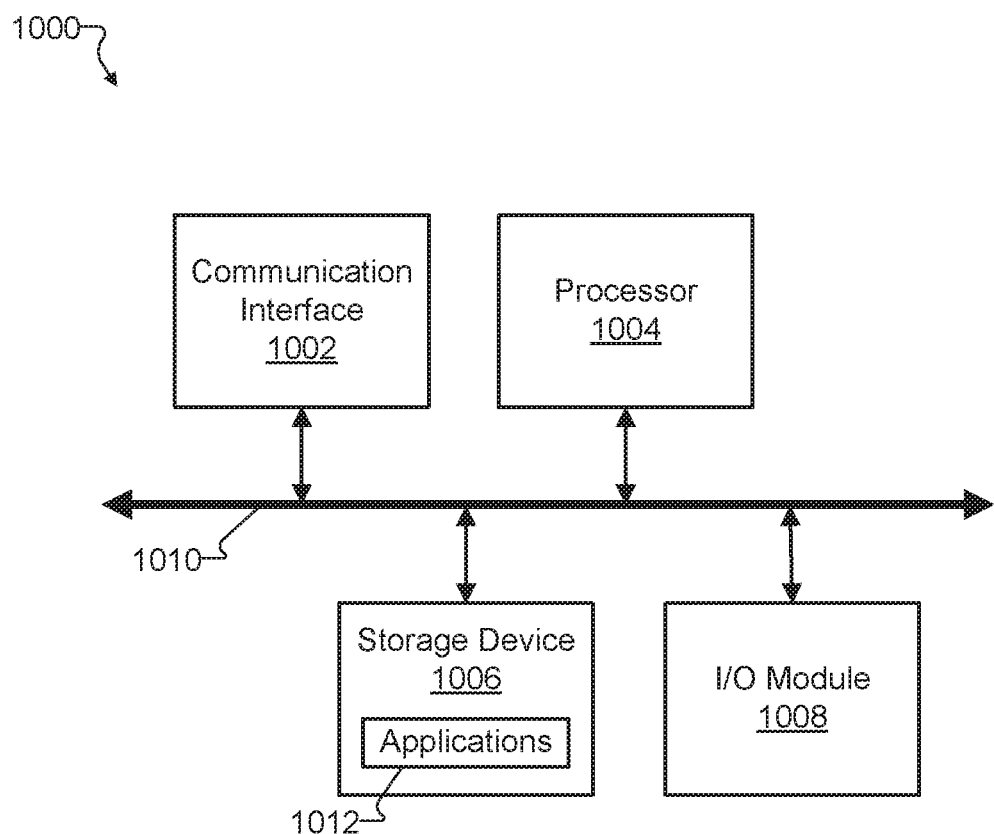
FIG. 10 shows an illustrative computing device according to embodiments described herein.

FIG. 10 shows an illustrative computing device 1000 that may be specifically configured to perform one or more of the processes described herein. For example, computing device 1000 may include or implement (or partially implement) a volumetric capture system such as system 100, any of the components thereof, or any other computing devices described herein.

As shown in FIG. 10, computing device 1000 may include a communication interface 1002, a processor 1004, a storage device 1006, and an input/output ("I/O") module 1008 communicatively connected via a communication infrastructure 1010. While an illustrative computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, an audio/video connection, and any other suitable interface.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1006. For example, data representative of one or more executable applications 1012 configured to direct processor 1004 to perform any of the operations described herein may be stored within storage device 1006. In some examples, data may be arranged in one or more databases residing within storage device 1006.

I/O module 1008 may include one or more I/O modules configured to receive user input and provide user output. One or more I/O modules may be used to receive input for a single virtual experience. I/O module 1008 may include any hardware, firmware, software, or combination thereof supportive of input and output capabilities. For example, I/O module 1008 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1000. For example, one or more applications 1012 residing within storage device 1006 may be configured to direct processor 1004 to perform one or more processes or functions associated with processing facility 104 of system 100. Likewise, storage facility 102 of system 100 may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    accessing, by a volumetric capture system, a two-dimensional (2D) image captured by a capture device and depicting a first subject of a particular subject type;

generating, by the volumetric capture system, a custom three-dimensional (3D) model of the first subject, the generating comprising:
- accessing a machine learning model associated with the particular subject type,
- semantically segmenting, using the machine learning model, the 2D image to distinguish a first component associated with the first subject from one or more additional components associated with the first subject,
- determining a parameter based on a characteristic of the distinguished first component of the semantically segmented 2D image,
- applying the parameter to a parametric 3D model associated with the particular subject type to generate a custom mesh for the custom 3D model, and
- applying a custom texture based on the 2D image to the custom mesh;

accessing, by the volumetric capture system, a motion capture video depicting motion performed by a second subject of the particular subject type; and animating, by the volumetric capture system based on the motion capture video, the custom 3D model of the first subject to cause the custom 3D model to perform the motion performed by the second subject.

2. The method of claim 1, wherein:
the 2D image is a first 2D image depicting the first subject from a first perspective, the first perspective providing a view of a first part of the first subject in front of a background that meets the first subject along a first boundary in the first 2D image;
the method further comprises accessing, by the volumetric capture system, a second 2D image captured by the capture device and depicting the first subject from a second perspective, the second perspective providing a view of a second part of the first subject in front of a background that meets the first subject along a second boundary in the second 2D image;
the first part of the first subject captured from the first perspective in the first 2D image is distinct from and overlapping with the second part of the first subject captured from the second perspective in the second 2D image; and
the custom texture applied to the custom mesh is based on a weighted mix of imagery of the first and second 2D images in which:
- imagery of the first 2D image nearer the first boundary is weighted less heavily than imagery of the first 2D image farther from the first boundary, and
- imagery of the second 2D image nearer the second boundary is weighted less heavily than imagery of the second 2D image farther from the second boundary.

3. The method of claim 1, wherein:
the particular subject type is a human subject type;
the first subject is a particular person;
the first component distinguished from the one or more additional components in the 2D image is a body part of the particular person;
the custom mesh is formed from a plurality of interconnected vertices that includes a first vertex associated with the first component; and
the generating of the custom 3D model of the first subject further comprises assigning a first displacement parameter to the first vertex, the first displacement parameter indicative of how loosely coupled the first vertex is with a skeletal structure of the custom 3D model of the first subject.

4. The method of claim 3, wherein:
the one or more additional components in the 2D image includes a second component that is an article of clothing worn by the particular person;
the plurality of interconnected vertices forming the custom mesh further includes a second vertex associated with the second component;
the generating of the custom 3D model of the first subject further comprises assigning a second displacement parameter to the second vertex, the second displacement parameter indicative of how loosely coupled the second vertex is with the skeletal structure; and
the second displacement parameter assigned to the second vertex is greater than the first displacement parameter assigned to the first vertex.

5. The method of claim 1, wherein:
the parametric 3D model includes a plurality of joints shared by all subjects of the particular subject type; and
a particular joint of the plurality of joints is assigned a constraint defining a manner in which the particular joint is allowed to move.

6. The method of claim 1, wherein:
the capture device is a mobile device that includes a built-in camera configured to capture the 2D image;
the volumetric capture system is implemented by the mobile device; and
the 2D image is represented by image data that includes color data captured by the camera and that does not include depth data.

7. The method of claim 1, wherein:
the method further comprises animating, by the volumetric capture system based on the motion capture video, the parametric 3D model associated with the particular subject type to cause the parametric 3D model to perform the motion performed by the second subject; and
the animating of the custom 3D model of the first subject includes performing a pose transfer operation to direct the custom 3D model to emulate a pose of the parametric 3D model as the parametric 3D model performs the motion performed by the second subject.

8. The method of claim 1, wherein:
the method further comprises accessing, by the volumetric capture system, a 2D video captured by the capture device and depicting the first subject as the first subject turns to provide the capture device with a view of the first subject from multiple different perspectives;
the 2D video includes a plurality of 2D images including the 2D image and the accessing of the 2D image is performed as part of the accessing of the 2D video; and
the determining of the parameter is performed based on the 2D video that includes the plurality of 2D images including the 2D image.

9. The method of claim 1, wherein:
the particular subject type is a human subject type;
the first subject is a first person; and
the second subject is a second person distinct from the first person.

10. A system comprising:
a memory storing instructions; and
a processor communicatively coupled to the memory and configured to execute the instructions to:

access a two-dimensional (2D) image captured by a capture device and depicting a first subject of a particular subject type;
generate a custom three-dimensional (3D) model of the first subject, the generating comprising:
  accessing a machine learning model associated with the particular subject type,
  semantically segmenting, using the machine learning model, the 2D image to distinguish a first component associated with the first subject from one or more additional components associated with the first subject,
  determining a parameter based on a characteristic of the distinguished first component of the semantically segmented 2D,
  applying the parameter to a parametric 3D model associated with the particular subject type to generate a custom mesh for the custom 3D model, and
  applying a custom texture based on the 2D image to the custom mesh;
access a motion capture video depicting motion performed by a second subject of the particular subject type; and
animate, based on the motion capture video, the custom 3D model of the first subject to cause the custom 3D model to perform the motion performed by the second subject.

11. The system of claim 10, wherein:
the 2D image is a first 2D image depicting the first subject from a first perspective, the first perspective providing a view of a first part of the first subject in front of a background that meets the first subject along a first boundary in the first 2D image;
the processor is further configured to execute the instructions to access a second 2D image captured by the capture device and depicting the first subject from a second perspective, the second perspective providing a view of a second part of the first subject in front of a background that meets the first subject along a second boundary in the second 2D image;
the first part of the first subject captured from the first perspective in the first 2D image is distinct from and overlapping with the second part of the first subject captured from the second perspective in the second 2D image; and
the custom texture applied to the custom mesh is based on a weighted mix of imagery of the first and second 2D images in which:
  imagery of the first 2D image nearer the first boundary is weighted less heavily than imagery of the first 2D image farther from the first boundary, and
  imagery of the second 2D image nearer the second boundary is weighted less heavily than imagery of the second 2D image farther from the second boundary.

12. The system of claim 10, wherein:
the particular subject type is a human subject type;
the first subject is a particular person;
the first component distinguished from the one or more additional components in the 2D image is a body part of the particular person;
the custom mesh is formed from a plurality of interconnected vertices that includes a first vertex associated with the first component; and
the generating of the custom 3D model of the first subject further comprises assigning a first displacement parameter to the first vertex, the first displacement parameter indicative of how loosely coupled the first vertex is with a skeletal structure of the custom 3D model of the first subject.

13. The system of claim 12, wherein:
the one or more additional components in the 2D image includes a second component that is an article of clothing worn by the particular person;
the plurality of interconnected vertices forming the custom mesh further includes a second vertex associated with the second component;
the generating of the custom 3D model of the first subject further comprises assigning a second displacement parameter to the second vertex, the second displacement parameter indicative of how loosely coupled the second vertex is with the skeletal structure; and
the second displacement parameter assigned to the second vertex is greater than the first displacement parameter assigned to the first vertex.

14. The system of claim 10, wherein:
the parametric 3D model includes a plurality of joints shared by all subjects of the particular subject type; and
a particular joint of the plurality of joints is assigned a constraint defining a manner in which the particular joint is allowed to move.

15. The system of claim 10, wherein:
the capture device is a mobile device that includes a built-in camera configured to capture the 2D image;
the memory and processor are included within the mobile device; and
the 2D image is represented by image data that includes color data captured by the camera and that does not include depth data.

16. The system of claim 10, wherein:
the processor is further configured to execute the instructions to animate, based on the motion capture video, the parametric 3D model associated with the particular subject type to cause the parametric 3D model to perform the motion performed by the second subject; and
the animating of the custom 3D model of the first subject includes performing a pose transfer operation to direct the custom 3D model to emulate a pose of the parametric 3D model as the parametric 3D model performs the motion performed by the second subject.

17. The system of claim 10, wherein:
the processor is further configured to execute the instructions to access a 2D video captured by the capture device and depicting the first subject as the first subject turns to provide the capture device with a view of the first subject from multiple different perspectives;
the 2D video includes a plurality of 2D images including the 2D image and the accessing of the 2D image is performed as part of the accessing of the 2D video; and
the determining of the parameter is performed based on the 2D video that includes the plurality of 2D images including the 2D image.

18. The system of claim 10, wherein:
the particular subject type is a human subject type;
the first subject is a first person; and
the second subject is a second person distinct from the first person.

19. A non-transitory computer-readable medium storing instructions that, when executed, direct a processor of a computing device to:
access a two-dimensional (2D) image captured by a capture device and depicting a first subject of a particular subject type;

generate a custom three-dimensional (3D) model of the first subject, the generating comprising:
  accessing a machine learning model associated with the particular subject type,
  semantically segmenting, using the machine learning model, the 2D image to distinguish a first component associated with the first subject from one or more additional components associated with the first subject,
  determining a parameter based on a characteristic of the distinguished first component of the semantically segmented 2D image,
  applying the parameter to a parametric 3D model associated with the particular subject type to generate a custom mesh for the custom 3D model, and
  applying a custom texture based on the 2D image to the custom mesh;
access a motion capture video depicting motion performed by a second subject of the particular subject type; and
animate, based on the motion capture video, the custom 3D model of the first subject to cause the custom 3D model to perform the motion performed by the second subject.

20. The non-transitory computer-readable medium of claim 19, wherein:
  the particular subject type is a human subject type;
  the first subject is a particular person;
  the first component distinguished from the one or more additional components in the 2D image is a body part of the particular person;
  the custom mesh is formed from a plurality of interconnected vertices that includes a first vertex associated with the first component; and
  the generating of the custom 3D model of the first subject further comprises assigning a first displacement parameter to the first vertex, the first displacement parameter indicative of how loosely coupled the first vertex is with a skeletal structure of the custom 3D model of the first subject.

* * * * *